United States Patent
Bullock (10) Patent No.: US 7,018,151 B2
(45) Date of Patent: Mar. 28, 2006

(54) CARGO RESTRAINT SYSTEM AND METHOD

(76) Inventor: Matthew Bullock, 4509 N. 7th St., Arlington, VA (US) 22203

( * ) Notice: Subject to any disclaimer, the term of this patent is extended or adjusted under 35 U.S.C. 154(b) by 0 days.

(21) Appl. No.: 10/730,040

(22) Filed: Dec. 9, 2003

(65) Prior Publication Data

US 2005/0123370 A1   Jun. 9, 2005

(51) Int. Cl.
*B60P 7/08* (2006.01)

(52) U.S. Cl. .......................... 410/97; 410/34; 410/100

(58) Field of Classification Search ............... 410/32, 410/34, 36, 42, 96–97, 100, 155; 220/1.5; 206/597, 410; 53/399, 441, 462, 556; 248/499
See application file for complete search history.

(56) References Cited

U.S. PATENT DOCUMENTS

| | | |
|---|---|---|
| 2,269,286 A | 1/1942 | Ott |
| 3,547,457 A | 12/1970 | Langer |
| 3,612,463 A | 10/1971 | Grant |
| 3,848,889 A | 11/1974 | Sharrow |
| 3,897,919 A | 8/1975 | Weingarten |
| 3,910,558 A | 10/1975 | Brucker et al. |
| 4,054,226 A | 10/1977 | Bjelland et al. |
| 4,111,132 A | 9/1978 | Plut |
| 4,264,251 A * | 4/1981 | Blatt ........................ 410/100 |
| 4,553,888 A | 11/1985 | Crissy et al. |
| 4,640,853 A | 2/1987 | Schmeal et al. |
| 4,846,610 A | 7/1989 | Schoenleben |
| 4,964,771 A | 10/1990 | Callihan |
| 5,037,256 A | 8/1991 | Schroeder |
| 5,062,751 A | 11/1991 | Liebel |
| 5,086,038 A | 2/1992 | Naef et al. |
| 5,132,156 A | 7/1992 | Trassare, Jr. et al. |
| 5,139,842 A | 8/1992 | Sewell |
| 5,431,284 A | 7/1995 | Wilson |
| 5,484,643 A | 1/1996 | Wise et al. |
| 5,516,244 A | 5/1996 | Baka |
| 5,568,636 A | 10/1996 | Koford |
| 5,595,315 A | 1/1997 | Podd et al. |
| 5,784,761 A | 7/1998 | Allen |
| 5,855,459 A | 1/1999 | Krier et al. |
| 5,947,666 A | 9/1999 | Huang |
| 6,089,802 A * | 7/2000 | Bullock ........................ 410/97 |
| 6,227,779 B1 * | 5/2001 | Bullock ........................ 410/98 |
| 6,368,036 B1 * | 4/2002 | Vario ........................ 410/98 |
| 6,419,434 B1 | 7/2002 | Rahn |
| 6,435,787 B1 | 8/2002 | John |
| 6,527,488 B1 | 3/2003 | Elze et al. |
| 6,533,513 B1 | 3/2003 | Kanczuzewski et al. |
| 6,607,337 B1 * | 8/2003 | Bullock ........................ 410/97 |

(Continued)

FOREIGN PATENT DOCUMENTS

EP   1184436 A1   3/2002

(Continued)

OTHER PUBLICATIONS

"Hexacomb kraft honeycomb: Pactiv Panels" Sales Brochure, Copyright 1996.

*Primary Examiner*—Stephen Gordon
(74) *Attorney, Agent, or Firm*—Bradford Kile; Kile Goekjian Reed & McManus PLLC (57) ABSTRACT

A load restraint system and method for securing cargo within transport containers having corrugated side wall surfaces with lands and alternative valleys said load restraining strips are attached to the side wall surfaces only on the land surfaces of the transport container.

7 Claims, 5 Drawing Sheets

U.S. PATENT DOCUMENTS

| | | |
|---|---|---|
| 6,702,532 B1 | 3/2004 | Throener |
| 6,758,644 B1 * | 7/2004 | Vick .......................... 410/100 |
| 2003/0206782 A1 | 11/2003 | Toglia |

FOREIGN PATENT DOCUMENTS

| | | |
|---|---|---|
| WO | WO09301979 A1 | 2/1993 |

* cited by examiner

CARGO RESTRAINT SYSTEM AND METHOD

RELATED PATENTS

This application relates to U.S. Pat. No. 6,089,802 entitled "Cargo Restraint System for a Transport Container" issued on Jul. 18, 2000, U.S. Pat. No. 6,227,779 entitled "Cargo Restraint Method for a Transport Container" issued on May 8, 2001, and U.S. Pat. No. 6,607,337 entitled "Cargo Restraint System" issued on Aug. 19, 2003, all of common inventorship and assignment as the subject application.

BACKGROUND OF THE INVENTION

This invention relates to an improved system and method for restraining cargo during transportation. More particularly, this invention relates to a novel system and method for securing and restraining undesired movement of drums, boxes, rigid and flexible containers, palletized or not palletized, within the interior of an intermodal container or the like. Moreover this invention relates to a system and method of enhanced securement strength and reduction of load shifting during transport.

Most shipments for export, both in the United States and abroad, are placed into intermodal containers. These containers have standardized dimensions of twenty or forty feet in length and are fabricated with steel, corrugated sidewalls which are structurally self-supporting and rugged. Several intermodal containers may be stacked on top of each other for transport by sea, rail, or road. Within the containers, drums, boxes, etc. hold actual product.

Intermodal containers are often loaded with cargo in containment enclosures such as fifty five gallon closed head drums, super sacks or plastic reinforced bags, plastic wrapped bundles, cased goods, metal coils, specialty heavy paper rolls, plastic or metal containers mounted on pallets, and the like. Although each containment enclosure or bundle may be quite heavy and stationary at rest, the mass of a transport load can produce considerable momentum force as a truck or rail car is placed in motion.

The cargo of these intermodal containers experience various forces throughout the course of transport. On overland routes intermodal containers are positioned on railroad flat cars of truck trailers. Rail cars may be made up by a coupling or humping process within a switching yard. When a railroad car is rolled into a stationary string of cars, the impact causes the car couplings to lock together with a jolt. This impact can apply a significant force to cargo within the rail car. Moreover, during transport, railway cars are subject to braking forces, run-in and run-out coupler impact over grades, rail vibration, dips in the track, and swaying. In a similar manner trucks are subject to stopping and starting forces, emergency braking, bumps and swaying from uneven road beds, centrifugal forces on curves, vibration, etc. which tend to shift loads.

In addition to overland shipping intermodal containers are stacked onto ships for ocean transport and are subjected to wave forces including: yaw, pitch, heave, sway, and surge. Each of these forces has the potential to impart a substantial force onto the contents within an intermodal container. In this, when a container changes direction or speed, cargo within the container tends to continue along the previously existing path until it contacts an interior wall of the container. Without some type of restraint and/or cushioning system, the cargo builds up considerable momentum, independent of the container. The amount of momentum is equal to the mass of a load multiplied by its velocity. In the case of large cargo loads, even a small change in velocity or direction can generate substantial forces.

When cargo contacts the interior walls or doors of a container, the force necessary to reduce its momentum to zero must be absorbed by the goods and/or the container. Such forces can result in damage to the cargo, damage to the interior walls or doors of the container, damage to the cargo packing, and may create dangerous leaks if the cargo is a hazardous material. Accordingly, it is undesirable to permit cargo to gain any momentum independent of a container during transport. This is accomplished by restraining the cargo within the container so that the cargo and the container are essentially united and operationally function as one object during transport.

In order to secure the load during transport and minimize undesired shifting and damage the load containment enclosures are often secured to the floor and/or sides of the trailer or boxcar by specially fabricated wood framing, floor blocking, rubber mats, steel strapping, heavy air bags, etc. Each of these previously known systems for securement have limitations associated with construction cost, lack of strength sufficient to secure dense loads, etc. Moreover, although rear doors of a trailer may be relied on to at least partially secure non-hazardous materials such as food-stuffs, tissue or soft paper products, furniture, appliances, etc., for hazardous materials, and many other types of loads, the rear doors of a container may not be used to even partially secure a load. In fact, in order to comply with Department of Transportation Regulations and Bureau of Explosives, hazardous materials are not even permitted to come in contact with rear doors during an impact.

Still further in some instances a trailer or boxcar may be used for shipping where only a partial load is carried. Moreover, a partial load might be positioned within a center location of a trailer. In this instance it may be impractical to construct wooden front and rear dunnage sufficient to secure a load where the front of the trailer is not utilized.

In the past, various dunnage materials have been utilized within trailers and/or intermodal containers to eliminate unwanted movement or shifting of a load during transport. The drums, boxes, or other containers have been restrained in several different ways. Primarily, cargo was stabilized by a method of load-locking and lumber bracing. This system involves strategically placing lumber between a load face and the rear doors of a container. This, however, can be a costly, time consuming, and generally inefficient means of securing a load. In this, the blocking process requires carpenters and is often outsourced to contractors. Moreover, wooden barriers can be time consuming to install. Further wood bracing can be somewhat brittle and subject to failure as a result of an abrupt impact.

In addition to the above, conventional methods of load-blocking with lumber bracing simply can not perform some tasks. For example, the most efficient means of filling an intermodal container is eighty, fifty-five gallon drums, double stacked in a twenty-foot long container. However, if eighty barrels are loaded there are only approximately four inches between the load face and rear doors of the container. Four inches is not enough space to put sufficient lumber to brace a load of eighty drums adequately. Consequently, when wood bracing is utilized as a system of restraint, shippers are forced to ship containers that are not filled to capacity. This reduces transport efficiency and increases transportation costs. Moreover, some types of wood, such as conifer woods, are not acceptable to cross international boundaries without certification of special fumigation or heat treatment processing of conifer wood dunnage. In this the International Plant Protection Convention ("IPPC") has issued "Guidelines for Regulating Wood Packaging Material in International Trade" having specific sections, requirements and limitations with respect to wood dunnage that has been accepted by numerous countries including the United States.

The Department of Transportation has established a standard to determine if a particular restraint system is capable of adequately securing hazardous cargo. In certain instances, conventional load-locking and lumber bracing has not received approval to ship hazardous cargo.

Other known means of restraint such as ropes, metal or plastic straps or stands and the like appearing in the past have tended to exhibit impaired performance and are often not functionally suitable to restrain loads under even moderate conditions. Consequently, a need exists for securing lading in truck trailers, boxcars, and intermodal containers that is functionally effective, cost-efficient, labor-efficient, and able to comply with Department of Transportation and Bureau of Explosives regulations. Still further a need exists for securement systems that have enhanced strength characteristics and limit lading travel within a container.

At least one method and apparatus for restraining cargo movement which overcomes some of the foregoing limitations is disclosed in U.S. Pat. No. 4,264,251, of common assignment with the subject application. The invention disclosed in that patent comprises sealing strips that are adhered to opposing sidewalls of a container, a strip of bracing material, and a joining mechanism are used to bind the ends of the strips together into a secure and taut restraint.

In the '251 patent, flexible securement strips are applied in a manner similar to hanging wallpaper, wherein an adhesive is applied onto a surface within a trailer where adhesion is desired. Then a retaining strip is applied to the adhesive. In addition to this requirement of a separate adhesive, systems appearing in the past sometimes encountered problems associated with weakness at the joints. At the juncture where the strips came together, an opportunity existed for slippage of the joined panels. Moreover, intermodal containers have corrugated walls as noted above. These corrugations make applying a restraining strip to a separate adhesive, which may not have an even application, substantially more difficult.

In addition to the restraining system disclosed in U.S. Pat. No. 4,264,251 other systems have been developed that provide enhanced operating characteristics and advantages, as discussed in the above identified U.S. Pat. Nos. 6,089,802; 6,227,779 and 6,607,337 all of common inventorship and assignment as the subject application. The disclosures of these prior four patents, of common assignment as the subject application, are hereby incorporated by reference as though set forth at length.

Further to these prior systems of securing lading in intermodal containers increasing attention has been placed on securing heavier and denser loads, including hazardous materials, without abandoning the advantages achieved by previously known commercial systems. Moreover, there is interest in decreasing the elastic and/or plastic elongation and enhancing the vertical securement function so that hazardous materials can be transported with enhanced efficiency and security. In this regard it would be desirable to utilize an eighty, fifty five gallon, drum load within a conventional intermodal container. In this arrangement four steel drums need to be positioned next adjacent to the rear door of an intermodal container. In the past, issues have existed with respect to unacceptable travel of loads which may even come into contact with rear doors of the container during impact. As noted above, for hazardous loads, load contact with the rear doors is not acceptable by HazMat regulations.

In addition to the above, other restraining systems known in the past required multiple elements which were cumbersome to store, were arduous to install, and often required a degree of skilled labor. Systems using straps, nails, anchors, or bolts all require substantial storage space even when not in use. Furthermore, such systems increase the safety risk to the workers restraining the cargo. Still further such systems have often been unable to satisfy safety and travel limits imposed by regulatory bodies in various countries.

In addition to the above concerns, systems and procedures used in the past relying on accessories located within the cargo container often were not able to secure a partial load. That is, if the load does not extend to the front or rear of the container, such as a centrally located load, the necessary anchors may not be available in an area where they can be effectively used.

The problems suggested in the preceding are not intended to be exhaustive but rather are among many which may tend to reduce the effectiveness of cargo restraining systems known in the past. Other noteworthy problems may also exist; however, those presented above should be sufficient to demonstrate that cargo-restraining systems appearing in the past will admit to worthwhile improvement.

OBJECTS AND SUMMARY OF THE INVENTION

Objects

It is a general object that the subject invention provide a novel system and method to secure a load within an intermodal container, or the like, which will obviate or minimize problems and concomitantly achieve at least some of the desired aspects of lading securement of the type previously described.

It is another general object of the subject invention to judiciously protect cargo from damage during transport and to provide enhanced securement of a load within a container while minimizing shifting of a container load.

It is a specific object of the invention to provide a securement system and method for an intermodal container, and the like, with enhanced strength to restrain a load in position during impact and/or other transport forces and reduce travel of lading within an intermodal container.

It is a related object of the invention to provide a securement system and method for an intermodal container, and the like, where the amount of load travel for a given level of impact is minimized.

It is another object of the subject invention to reduce the material and labor costs involved in securing lading within an intermodal container, and the like.

It is yet another object of the subject invention to provide a system capable of restraining eighty, fifty-five gallon drums, double stacked, in a forty foot intermodal container capable of receiving Department of Transportation and Bureau of Explosives approval.

It is a particular object of the subject invention to provide a method for securing cargo that is self-contained and may be installed quickly, reliably, and efficiently by relatively unskilled labor, in intermodal containers having corrugated walls.

It is another object of the subject invention to provide for efficient and simple removal of the securing system from an intermodal container, or the like, at a cargo destination.

It is still a further object of the subject invention to provide a system for restraining cargo that is able to withstand a wide range of temperatures and levels of humidity to enable effective use in a wide range of ambient environments.

It is a specific object of the invention to provide a method and system for securing a load within an intermodal container where the force to failure is dramatically increased.

BRIEF SUMMARY OF THE INVENTION

One preferred embodiment of the invention, which is intended to accomplish at least some of the foregoing objects, comprises method for securing cargo within a transport container having corrugated side walls, such as an intermodal container. The side walls have repeating land and valley surfaces and a flexible restraining strip is applied to an interior surface of the container. Adhesion of the strip to the container side wall is provided by an adhesive layer that is applied only to the land surfaces of the side wall. The flexible restraining strips bridge over the valley portions of the side walls but are not pressed into contact with the valley surfaces such that the restraining strip is essentially liner along the corrugated and undulating side wall of the container and in adhearing contact with only the land areas of the side wall surfaces.

The load restraining strips include at least one reinforcement layer, such as fiber reinforcement strands or a monolithic high strength extruded sheet. In one preferred embodiment the adhesive which attaches the load restraining strips to the side walls of the container is fashioned in transverse strips that have a width that corresponds to the width of the land areas of the corregated side wall surfaces of the container side walls.

A polyethylene coated release paper layer is applied on the outside surface of the adhesive strips and the release paper is removed on site so that an installer can facilely apply the load restraining strip to the land surfaces of an interior wall surface of a transport container.

In use, a length of a load restraining strip, approximately twelve feet in length, is cut from a reel and a five to seven foot length of solid or transverse strips of adhesive are exposed by peeling away the release paper. Next, the exposed face of the layer of adhesive is self-adhered to only the land surfaces of the corregated interior sidewall surface of a transport container.

An identical second strip is applied to an opposing surface of the container in a mirror image posture and the free ends of the two load restraining strips are wrapped around goods to be secured within the container. The ends of opposing strips are overlapped at a center location around the load. A tensioning tool is then used to wind the two lapped ends together to draw the opposing load restraining strips taut around the load. A third, shorter piece of strip material, is cut from a separate roll of patch material and its release paper is removed. This shorter patch strip is adhered to the exposed surfaces of the two load restraining strips at the joint. The shorter patch piece thus locks the strips in place and forms a secure load restraining system.

THE DRAWINGS

Other objects and advantages of the present invention will become apparent from the following detailed description of preferred embodiments taken in conjunction with the accompanying drawings wherein.

DETAILED DESCRIPTION

Context of the Invention

Figure 1:
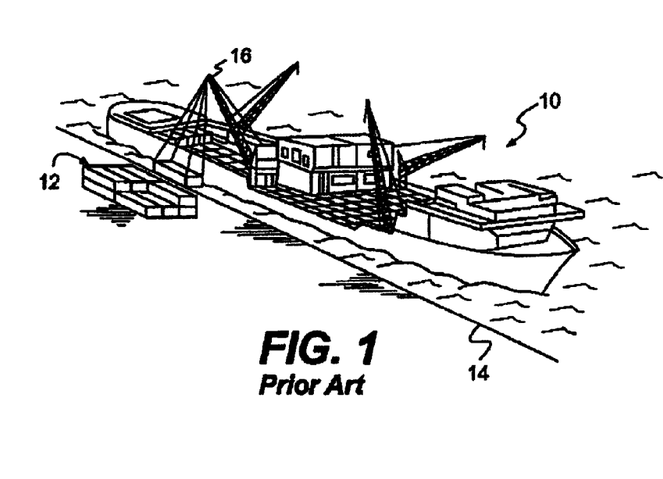
FIG. 1 is an aerial view of a ship at a dock with cranes lifting and loading intermodal containers onto the ocean going vessel.

Referring now particularly to FIG. 1, there is shown one operative context of the subject invention. In this, a ship 10 is shown docked at a port and intermodal containers 12 are being loaded onto the ship. Specifically, FIG. 1 depicts the ship 10 at a dock 14 and cranes 16 are lifting and loading the intermodal containers 12 to be stacked on the ocean going vessel 10. The subject invention may be advantageously used to secure cargo within the intermodal containers 12, like the ones being loaded onto the ship 10.

Figure 2:
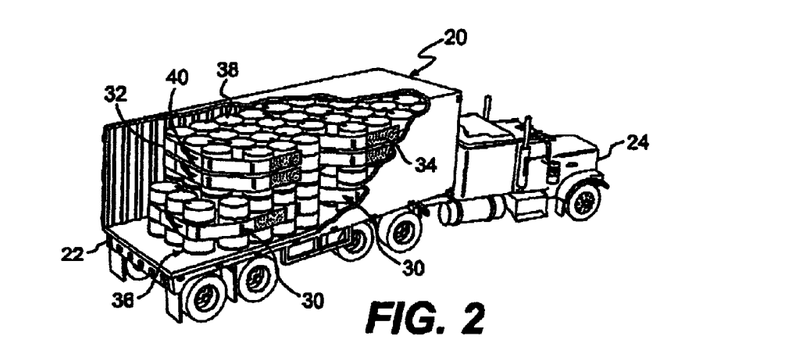
FIG. 2 is an axonometric view showing the interior of an intermodal container secured to a flatbed of a truck, with a partial load secured within the container.

FIG. 2 is an axonometric view that discloses a more detailed view of the operating environment of the invention. In this view an intermodal or cargo container 20 is shown mounted upon a trailer 22 which is operably towed by a tractor 24 for land transport. Containers such as these are also operable to be mounted on railway flat cars either directly or attached to trailers 22.

A partially cut away portion of FIG. 2 depicts a cargo restraining strip 30 which is operable to be adhered to an interior wall surface 32 of the intermodal cargo container 20. The cargo securement system shown in FIG. 2 comprises a pair of opposing restraining strips 30 adhered to the side walls of the container 20 by the use of adhesive segments 34 that self adhere to opposing portions of the container side walls. The restraining strips 30 then extend to be wrapped around and embrace cargo 36, such as fifty five gallon drums 38. The restraining strips 30 overlap and are folded and drawn tightly together by a torque tool. Then an independent overlying patch segment 40 is applied to the junction to unite the opposing restraining strips 30 from the container side walls around the cargo to secure the cargo to the interior wall surfaces of the container 20.

Figure 3:
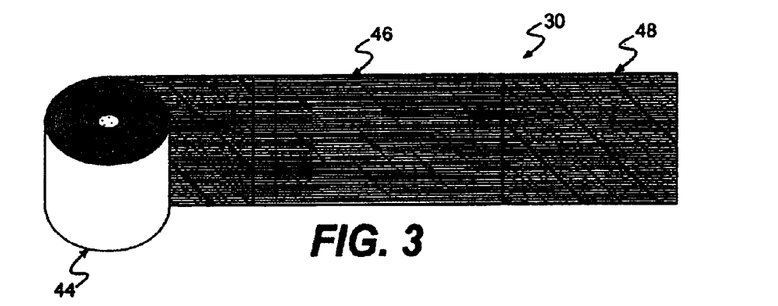
FIG. 3 is a pictorial view of the present invention showing a dispensing roll and one typical length of a securement restraining strip of enhanced strength, reduced elongation and vertical securement under impact loading in accordance with one preferred embodiment of the invention.

Turning now to FIG. 3, a general form of a typical restraining strip 30 such as illustrated in the related patents identified above. The restraining strips 30 are preferably manufactured and transported on reels or rolls 44. A roll 44 of strips 30 are manufactured in an end-to-end continuous fashion in lengths of approximately twelve feet composed with reinforced construction. An initial, approximately seven foot segment 46 is fabricated with a basic construction throughout the strip segments 30 and alternate approximately five foot segments 48, includes an extra self-adhering adhesive component. In one embodiment the strips 30 are transversely perforated, at approximately twelve foot lengths, so that a strip 30 can be torn off or in any event can be facially cut to create a single approximately twelve foot length of restraining strip 30 for use on a job site. Preferably, the restraining strip 30 is fifteen inches in width; however, other widths may be substituted depending on the need for additional strength, which a wider strip can provide.

Figure 4:
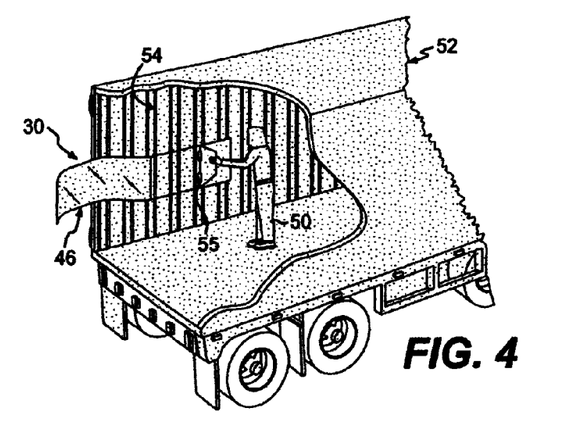
FIG. 4 is an axonometric segmental view partially broken away to disclose placement of securement strip in accordance with prior art techniques.
Figure 5:
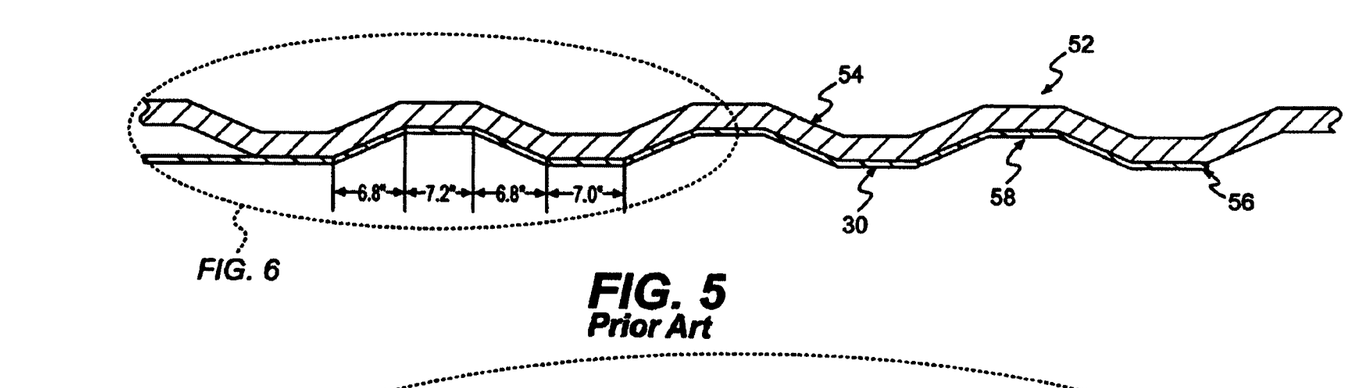
FIG. 5 depicts a partial, adhered to an inside surface of an intermodal container wall segment in accordance with the technique illustrated in FIG. 4.

FIGS. 4 and 5 disclose views of an individual load restraining strip 30 applied in accordance with a prior preferred technique of application of the strips to an intermodal container side wall surface. In this, FIG. 4 shows a load restraining strip 30 being applied to the side wall 54 of the intermodal container 52. As taught in the related patents listed above, an installer 50 can use a rolling tool 55, or similar device, that is designed to assist the installer in securely adhering the strip 30 to an undulating surface of an intermodal container. During installation an installer peels away a release paper from the self-adhering segment 48 of the load restraining strip 30 and smoothes the adhesive portion 48 of the strip against a corrugated sidewall surface of the intermodal container.

FIG. 5 is a partial cross-sectional view of a typical intermodal container sidewall with a load restraining strip 30 applied in the manner discussed above to an interior surface 54 of the sidewall. The sidewall interior surface 54 of an intermaodal container 52 is composed of a repeating sequence of land surfaces 56 and valleys 58. Intermodal containers 52 are dimensionally standardized and one frequently used container has a lateral land dimension of 7.0 inches, a first sloping surface with a lateral run of 6.8 inches, a valley base of 7.2 inches and a second sloping surface with a lateral length of 6.8 inches. As shown in FIG. 5 the adhesive portion 48 of the load restraining strip 30 is designed to cover three or four land surfaces 56 and two or three valleys 58 depending upon the length of the adhesive segment. Accordingly although the length of the adhesive segment 48 (note FIG. 3) is often manufactured to be approximately 5 feet the length this length may be increased to seven feet or more when the securement system is to be used with an intermodal container.

The adhesive is preferably an acrylic that exhibits the characteristics of high degree of adhesiveness and shear strength and bonds well to metals. In addition the adhesive must have excellent high temperature and cold temperature characteristics so that the intermodal container is operable to be shipped in all normal ambient overland and ocean going shipping conditions. Finally, the adhesive should have low peel strength characteristics so that when the intermodal container is unloaded the load restraining strips 30 may be facilely removed by being peeled away from the sidewall surfaces by hand without leaving an adhesive residue.

Figure 6:
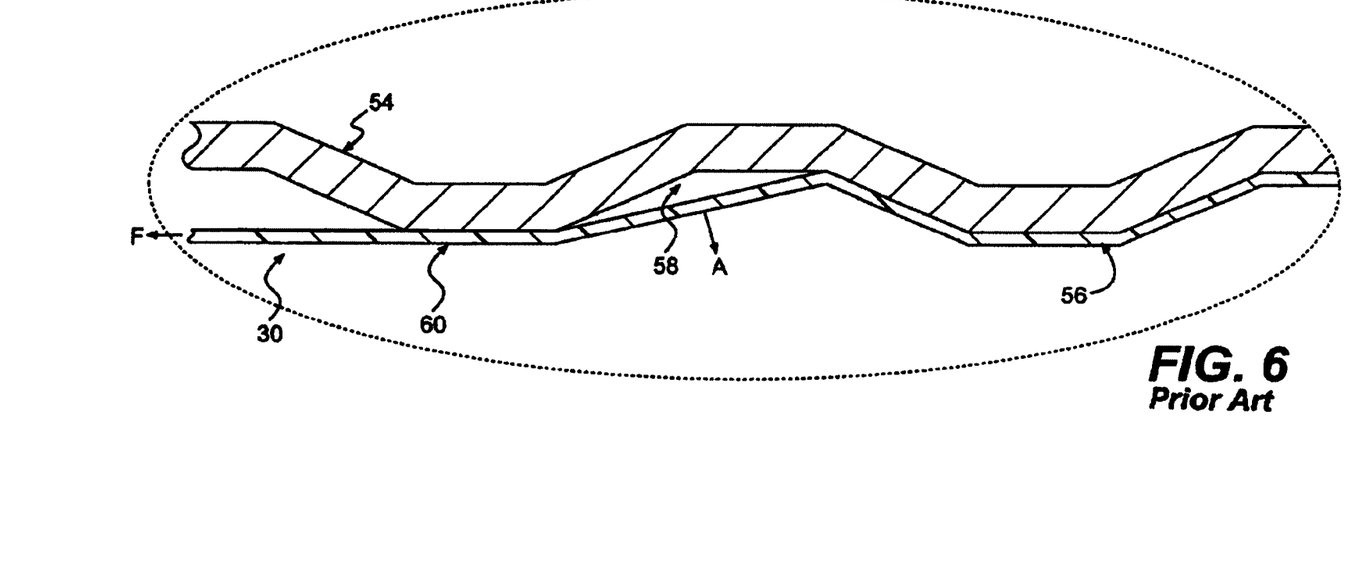
FIG. 6 is a detailed cross-sectional view of the circled area of FIG. 5 and showing a sequential failure mode of adhering contact of a securement strip, as applied by prior art techniques illustrated in FIG. 4, with an interior surface of an intermodal container.

Although the above described system of load restraining strips 30, as applied about loads within intermodal containers, is highly effective and a significant improvement over wood bracing and other previously know forms of securement, FIG. 6 discloses a limitation of the presently known flexible load restraining system for extra heavy loads. More specifically, FIG. 6 is an enlarged segment of a load securement strip 30 taken from the location circled in FIG. 5 where the load restraining strip 30 departs from secure adhesive contact with the container sidewall surface 54 to be wrapped around a load to be secured. When large axial loads are applied to the securement strips 30 a longitudinal force, shown by arrow "F", is applied to the strip 30. Rather than breaking or tearing the strip 30 there is a tendency for the securement strip to fail by permitting an unacceptable travel of the load. This occurs, as shown in FIG. 6, by the strip 30, which is designed to have a high shear strength but low peel resistance, peeling away from contact with the valley portion 58 of the intermodal container wall surface in the general direction of arrow "A". As the strip 30 peels away from the valley surfaces 58 essentially the entire longitudinal load is carried by the adhesive shear of the initial land surface 60 which tends to fail or "pop" free. This pattern is repeated sequentially from valley and land to valley and land along the sidewall 54 until the load is allowed to travel to an unacceptable degree which is defined as a failure condition even though the strip itself does not break.

Load Restraining Strips

Figures 7, 12:
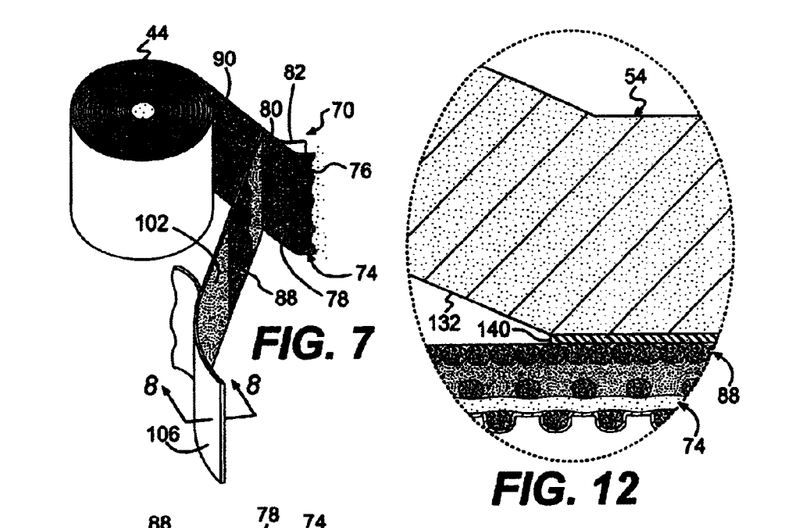
FIG. 7 is an axonometric view of a roll of securement strips to be applied to an interior wall surface of an intermodal container in accordance with a preferred embodiment of the invention.
FIG. 12 is a detailed enlarged view of the circled area shown in FIG. 11 showing adherence of an adhesive portion of a load restraining strip to a land surface area of the side wall of an intermodal-container in accordance with the invention.
Figures 8, 9:
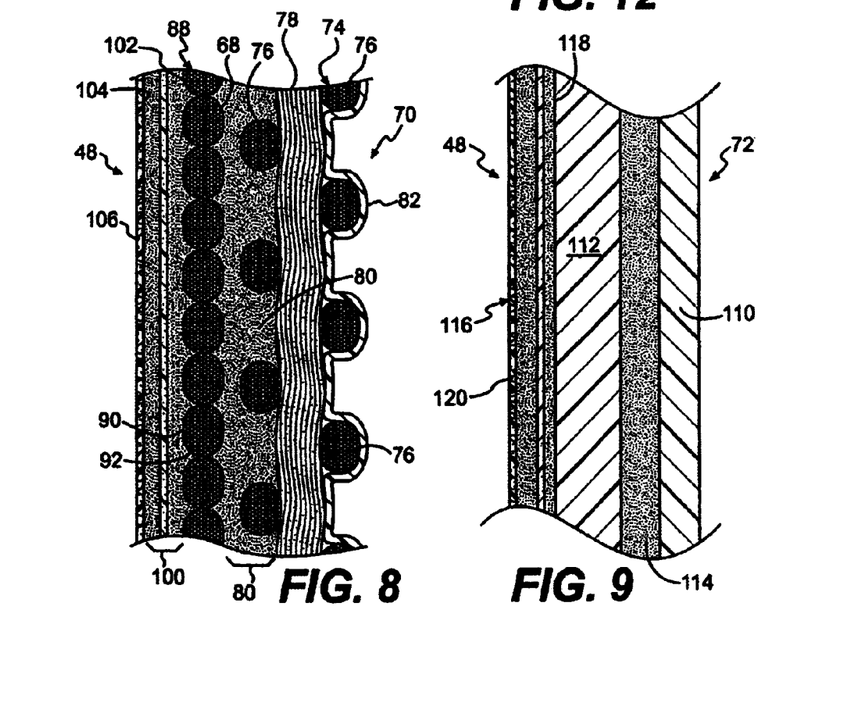
FIG. 8 is a detailed cross-sectional segment of a securement strip exhibiting one form of a cross-weave enhanced strength load restraining strip in accordance with one aspect of the invention.
FIG. 9 is a view similar in nature to FIG. 8, however, disclosing an alternative preferred embodiment of a monolithic enhanced strength load restraining strip in accordance one aspect of the invention.

Referring now to FIGS. 7 through 9 high strength, load restraining strips are disclosed which find particular utility with the subject invention.

FIGS. 7 and 8 disclose detailed views of one preferred embodiment 70 of a load restraining strip 30. FIG. 7 shows an expanded, partially redacted, view to disclose the relative position of components of the restraining strip 70, in accordance with one aspect of the subject invention. The restraining strip includes a first cross-weave layer of reinforcement material 74. The cross-weave layer 74 is preferably composed with a plurality of substantially parallel longitudinal strands 76 extending along the length of the restraining strip 70 and crossing strands 78. The crossing strands 78 are woven into the longitudinal strands 76 and have a next adjacent spacing that is approximately twice the spacing of next adjacent parallel longitudinal strands 76.

The cross-weave restraining strip 70 includes an adhesive layer 80 which overlays and bonds one surface of the cross-weave layer 74.

The first, cross-weave layer 74 of reinforcement further includes an outer coating 82 which adheres to an outer surface of the cross-weave components 76 and 78 and is preferably a thin layer of MYLAR®, although other materials may be used. The coating provides dimensional rigidity to the cross-weave and a protective clear or opaque coating.

The adhesive layer 80 is composed of compositions that have a high shear strength, wide operative temperature gradient—including cold weather tackiness and a specific gravity of less than one to displace moisture from the sidewalls of a container through capillary action. Adhesives of the type that are preferred are available from the Venture Tape Company of Rockland, Mass. The shear strength between the adhesive layers 72 and 74 is sufficient to transfer impact load forces to the reinforcing layers.

In addition to the first, cross-weave layer of reinforcement material 74 the subject invention includes a second, reinforcement layer 88 which is composed with a plurality of parallel strands 90.

As shown more particularly in FIG. 8 each of the strands 90 is composed of a plurality of finer denier strands 92 of reinforcing materials. The reinforcement strands 92 may be composed of fine polyester fibers, polypropylene, polyethylene, polyolefin, glass fiber, aramids including KEVLAR®, carbon fibers, and the like. KEVLAR® is a polyamide in which all the amide groups are separated by para-phenylene groups. KEVLAR® is a registered trademark of the DuPont Company of Wilmington, Del. Individual strand bundles 90 are directly abutted against and adhered to the second or outer surface 68 of the first adhesive layer 80 as shown in FIGS. 4 through 8.

In addition to the main body of the load restraining strip 70, lo which is continuous throughout the strip and comprises a cross-weave layer of reinforcement 74, an adhesive layer 80, a second reinforcement layer 88 composed with parallel strands 90, as discussed above, the subject invention includes a length of an extra self-adhering material 48, note again FIGS. 3 and 8.

Figure 13:
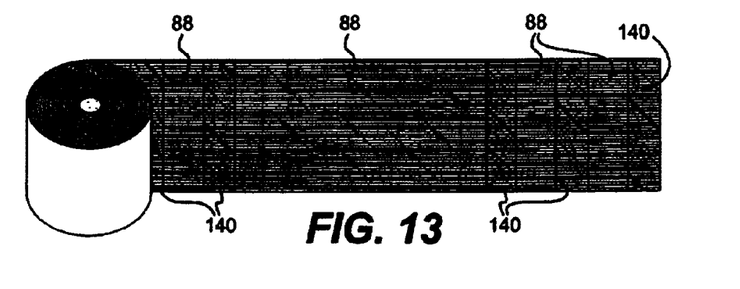
FIG. 13 is a view similar to FIG. 3 showing application of retaining adhesive on a load restraining strip only at lateral locations corresponding approximately to the land surface areas of a standard intermodal container side wall.

The self-adhering segment 48 comprise a second layer of adhesive 100 having a first side 102 in direct self-adhering contact with an outer layer of reinforcement strands 90. The second layer of adhesive material 100 has a second or outer side 104 and a release paper 106 extending over the outer most surface 104 of the second layer of adhesive 100. The release paper 106 enables individual segments of the subject load restraining strip 70 to be manufactured on a reel core as shown in FIG. 3 or 13 and the release paper 106 is peeled off of the load restraining strip 70 on site so that the second layer of adhesive 100 may be used by an installer to affix one end of the load restraining strip 70 to a corrugated sidewall surface of an intermodal container.

Although a substrate may not be needed for the first adhesive layer 80 in the event a substrate is necessary or desirable a substrate may be used. The substrate may be composed of an acrylic sheet having a plurality of transverse holes, a resin differential polymer with holes to render the substrate porous, or VALERON® which may be fashioned in the form of a screen foundation. Companies such as DuPont, Hoeschst Celanese, and others manufacture such materials. Alternatively, the substrate may not be porous provided that the shear strength of the adhesive materials is sufficient to carry axial loading as discussed below.

FIG. 9 discloses an alternative form of a restraining strip 30. In this embodiment a restraining strip 72 includes a first flexible, monolithic, strip of material 110 is joined to a second flexible, monolithic, strip of material 112 by an intermediate layer of adhesive 114. The outer free strip 110 has a thickness less than the strip 112 which is designed to be attached to an intermodal container sidewall surface. In this embodiment the two monolithic strips 110 and 112 are selected with differential thickness and composition, however, identical thickness and composition strips are also contemplated.

The first and second monolithic strips are preferably composed of an opaque or transparent composition of high strength polypropylene, high density polyethlene or low density polyethlene, polyethleneterephtalate, polyethleneterephtalate glycol, polyvinyl chloride, vinyl chloride monomer, or cross laminated polyethylene. These materials are known to those of ordinary skill in the art and sheets of high tensile strength characteristics are available from various high strength film manufacturing companies. As examples, polyethleneterephtalate ("PET") and polyethleneterephtalate glycol ("PETG") copolyester sheets are available as high strength extruded sheets from the Eastman Chemical Company of Kingsport, Tennessee. Cross laminated polyethylene is available in a brand known as VALERON® from Valeron Strength Films of Houston, Tex. Although these high strength sheet materials are presently preferred other high strength, monolithic extruded sheets of material are within the purview of the subject invention. Moreover, two or more of these materials may be combined to produce a monolithic or even layered composition.

In a preferred embodiment the monolithic sheets or strips of material 110 and 112 are joined together as an operating unit by an intermediate layer of adhesive 114. The composition of the adhesive may be chosen from a number of commercially available materials, however, a characteristic that is essential is a high shear strength since the adhesive layer needs to transfer axial loading from the strip 112 of the monolithic material to the other 110.

The adhesive layer 114 may be applied directly to the inner surfaces of the monolithic sheets 110 and 112 during a manufacturing process or may be carried by a central substrate (not shown) which may be a porous spun bond polyester or MYLAR®. When a substrate is used the adhesive layer 114 is divided into two portions of approximately equal thickness.

The self-adhering segments 48 comprises a second layer of adhesive 116 having a first side 118 in direct self-adhering contact with an outer surface of the second flexible, monolithic strip 112 as shown in FIG. 9. A release paper 120 extends over an outermost surface of the second layer of adhesive 116. The release paper 120 enables individual segments of the subject load restraining stripe to be manufactured on a reel or core, as shown in FIGS. 3 and 7, and the release paper 120 is peeled off of the individual load restraining strips 72 on site so that the second layer of adhesive 116 may be used by an installer to affix one end of the load restraining strip 72 to a sidewall, or other attachment surface of an intermodal container.

Method of Restraining Cargo

Figures 10, 11:
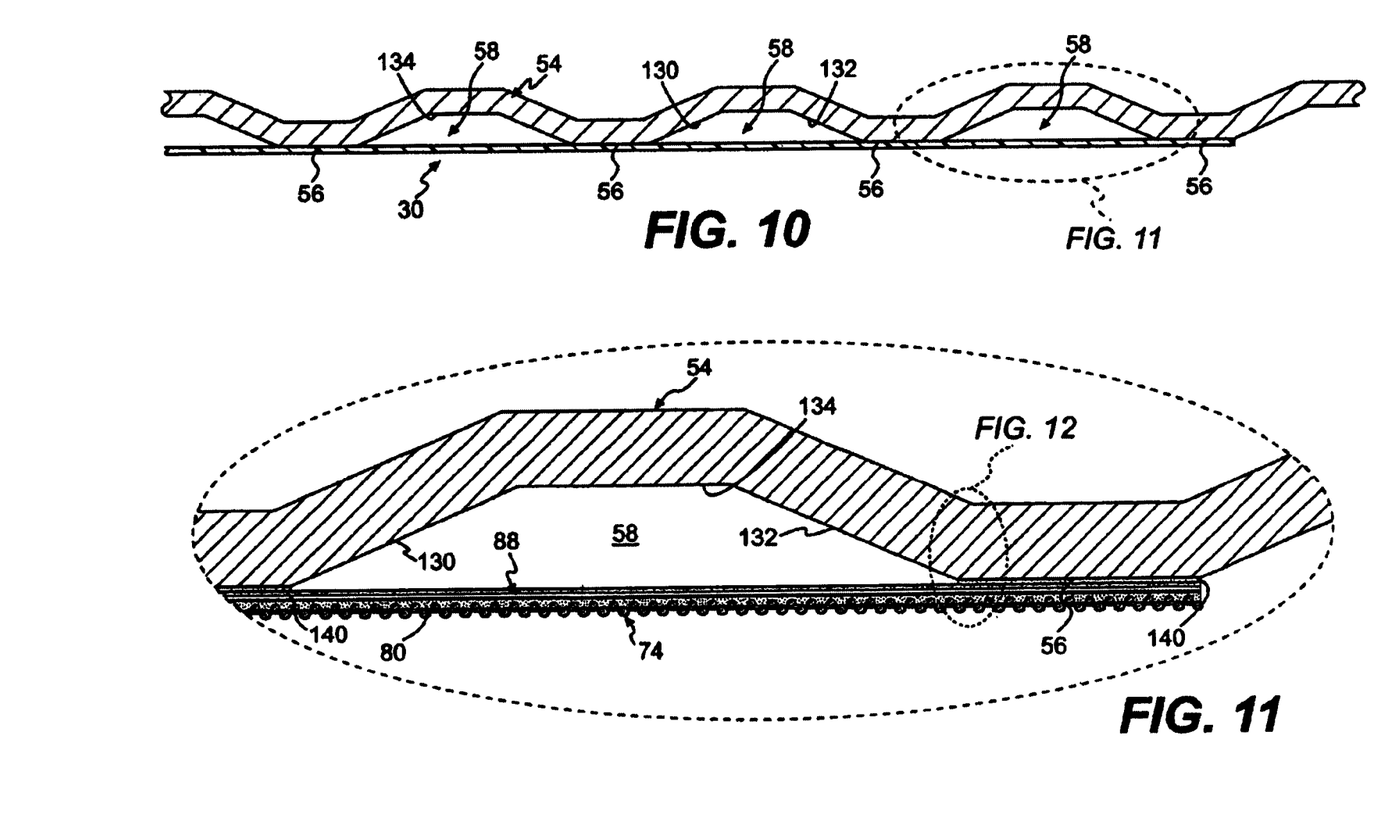
FIG. 10 is a partial cross-sectional view of securement of a load restraining strip to an interior wall surface of an intermodal container in accordance with one preferred form of the invention.
FIG. 11 is an enlarged detail cross-sectional view of the circled area depicted in FIG. 10 disclosing connection detail of a load restraining strip in accordance with one aspect of the invention with an interior wall surface of an intermodal container.

Turning now particularly to FIGS. 10 through 12 there will be seen an improved high strength securement system and method in accordance lo with the subject invention. FIG. 10 discloses a cross-sectional segment of an intermodal container sidewall 54 as discussed above. As noted intermodal containers are designed to be substantially uniform with specifications that include corrugated sidewalls 54 having a series of land surfaces 56 and valley regions 58.

As shown in FIG. 10, in accordance with the subject invention, the load restraining strips 30 are not applied to the valley regions 58 of the sidewalls 54 but rather are only applied to the land surfaces 56 and thus the load restraining strip is linear in its application and does not follow the valley surfaces such as the sloping sides 130 and 132 or the floor surface 134 of the valley regions 58. This linear application of the restraining strips eliminates any tendency of the strip 30 to "peel away" from a valley surface under load and the axial load is securely carried by the restraining strip.

In a manner that is counter intuitive, it has been found that the subject invention enables significantly higher loads to be carries by the restraining strips 30, without failure, even though there is substantially less adhesive contact between the restraining strips and the sidewall surfaces of the intermodal container.

FIGS. 8 and 9 disclose two structures of enhanced strength load restraining strips in accordance with one aspect of the invention. The first 70 has been referred to as having a cross-weave construction because of layer 74 and the second 72, disclosed in FIG. 9, has been referred to descriptively as a monolithic construction because of the monolithic layers 110 and 112. In yet another embodiment of an enhanced strength restraining strip 30 the cross-weave layer 74 of the construction disclosed in FIG. 8 is replaced with a parallel strand layer similar to 88. This third embodiment can be descriptive thought of as a laminated construction and again forms a component of the invention.

Although the above description should be sufficient to enable one of ordinary skill in the art to make and use any of the three constructions of a cross-weave, monolithic or laminated construction a more detailed description of these various constructions may be had by reference to three related applications for patent, filed on an even date herewith, and titled "Cross-Weave Cargo Restraint System and Method," "Monolithic Cargo Restraint System and Method" and "Laminated Cargo Restraint System and Method" respectively. The disclosures of these three applications, as filed herewith and of common inventorship and assignment, are hereby incorporated by reference into this application as though set forth at length.

Referring now to FIGS. 11 and 12 two detailed view of one preferred form of the invention is shown. In one embodiment of the invention any of the three types of restraining strips is operable to carry an adhesive layer across a region 48, note again FIG. 3, even though only the land surfaces 56 of the sidewalls of an intermodal container will come in contact with the adhesive layer. This arrangement has the advantage that a single design will accommodate all forms of intermodal or other corrugated sidewall containers. Such an arrangement is generally shown in FIG. 10.

At a more specialized level, and in accordance with another aspect of the invention the outer adhesive layers, such as layers 100 and 116, note again FIGS. 8 and 9, may be applied to the reinforcing strips in transverse strips 140. The strips correspond in width and spacing, note FIG. 13, to just the land surfaces 56 of intermodal containers. In this, a typical intermodal container has land surface areas with a width of seven inches. Accordingly, in a preferred embodiment of the invention each of the strips 140 has a width of seven inches and the spacing between adjacent strips 140 is determined the lateral run between adjacent land surfaces of an intermodal container. In one preferred embodiment this distance as illustrated in FIG. 5 is 20.8 inches. This spacing materially reduces the amount of adhesive that is necessary for any specific intermodal container design.

Having described in detail preferred embodiments of the invention, it may be useful to briefly set forth some of the major advantages of the invention.

SUMMARY OF MAJOR ADVANTAGES OF THE INVENTION

The subject invention provides a unique method and system for significantly enhancing strength and resistance to shifting of loads within corrugated containers such as intermodal containers.

This invention also provides an entirely self-contained load restraint system with an outer adhesive component 100 carried on the strip.

The transverse adhesive strips corresponding to land areas corrugated containers such as intermodal containers significantly saves on the amount of adhesive required while concomitantly providing enhanced resistance to load travel within a corrugated container.

This invention enables a cross-weave, monolithic or laminated load restraining strip to safely secure an entire load or even a partial load and moreover, to accomplish this without having to brace, nail, anchor, strap, or bolt, thereby substantially reducing labor costs and installation time.

This invention still further provides a product for restraining a load having enhanced sheer strength and eliminates peel failure so that a load is securely restrained during transport but upon arrival at the destination, it may be quickly removed and disposed of without leaving a residue on a container interior wall surface.

This invention yet further provides for superior gripping and restraining due to the adhesion to only land surfaces on corrugated, interior walls of an intermodal container.

This invention provides enhanced axial resistance to elongation so that it may be used in a system for transporting hazardous materials, and the like.

A particular advantage of the subject invention is the capability to secure full or partial loads with enhanced axial strength and resistance to elongation with use of only the land areas of an intermodal container.

Another significant advantage of the subject invention is ability to customize the roll of polyester self-adhesive material to the needs of a particular customer.

A further significant advantage of the subject invention is the ability to withstand the substantial force generated by restraining eighty fifty-five gallon drums, double stacked, in a twenty foot long container.

In describing the invention, reference has been made to preferred embodiments. Those skilled in the art, however, and familiar with the disclosure of the subject invention, may recognize additions, deletions, substitutions, modifications and/or other changes which will fall within the purview of the invention as defined in the following claims.

What is claimed is:

1. A load restraining strip for use in securing cargo within a transport container having corrugated interior side wall surfaces with alternating and vertically extending land and valley surface areas, said land surface areas extending into the interior of said container, said load restraining strip comprising:

at least a first strip of reinforcement material forming at least a portion of said load restraining strip; and a plurality of transverse adhesive strips connected to an outer portion of said at least a first strip of reinforcement material, beginning at one end thereof, and said adhesive strips extending transversely across said one end of said first strip of reinforcement material and being laterally spaced a distance to correspond to lateral spacing of said land surface areas of one of the interior side wall surfaces of the transport container such that said load restraining strip may be operably connected to the side wall surface of the transport container by adhering said plurality of transverse adhesive strips to corresponding ones of said land surface areas of the interior side wall surface of the transport container.

2. A load restraining strip for use in securing cargo within a transport container as defined in claim 1 and further comprising:
a plurality of release paper strips extending coextensively with and releasably adhered to said plurality of transverse adhesive strips, wherein said release paper strips may be removed front said plurality of transverse adhesive strips on site and said load restraining strip releasably affixed to the land surface areas of the transport container such that said load restraining strip may be used as a flexible securement element to secure cargo within the transport container.

3. A load restraining strip for use in securing cargo within a transport container as defined in claim 1 and further comprising:
a second strip of reinforcement material;
a first adhesive layer coextensively extending along, coating and bonding said first strip of reinforcement material to said second strip of reinforcement material to form the load restraining strip; and
said plurality of transverse adhesive strips being applied to an outer surface, at one end thereof, of said first and second strips of reinforcement material.

4. A load restraining strip for use in securing cargo within a transport container as defined in claim 3 wherein:
said first strip of reinforcement material comprises a cross-weave reinforcement material composed of, substantially parallel longitudinal strands extending along the length of said load restraining strip, and crossing strands interwoven with said substantially parallel longitudinal strands to produce said cross-weave layer of reinforcement material.

5. A load restraining strip for use in securing cargo within a transport container as defined in claim 3 wherein:
said first strip of reinforcement material comprises generally parallel strands of reinforcement material.

6. A load restraining strip for use in securing cargo within a transport container as defined in claim 3 wherein:
said first strip of reinforcement material comprises a monolithic strip of high strength material.

7. A load restraining strip for use in securing cargo within an intermodal transport container having corrugated interior side wall surfaces with alternating and vertically extending land and valley surface areas, said land surface areas extending into the interior of said container, said load restraining strip comprising:
a first monolithic layer of material and having a first side and a second side and being composed of a first monolithic sheet of flexible material;
a first adhesive layer having a first side and a second side and coextensively extending along, coating and bonding to said second side of said first monolithic layer of material;
a second monolithic layer of material and having a first side and a second side and being composed of a second monolithic sheet of flexible material, wherein said first adhesive layer is bonded to said second, monolithic layer of material;
a second layer of adhesive comprising a plurality of parallel transversely extending adhesive strips each having a first side and a second side and partially extending along and coating a portion of said second side of said second layer of monolithic material and being laterally spaced to correspond to a lateral spacing of the land surface areas one of the corrugated interior side wall surfaces of the intermodal container; and
release paper strips extending coextensively with and releasably adhered to the plurality of transverse adhesive strips of said second layer of adhesive, wherein said release paper strips may be removed from said plurality of transverse adhesive strips on site and said load restraining strip releasably affixed to only the land surface areas of an intermodal transport container such that said load restraining strip may be used as a flexible securement element to secure cargo within said transport container without engaging the valley surface areas of the side wall surfaces of the intermodal container.

* * * * *